United States Patent
Park et al.

(10) Patent No.: US 10,802,558 B2
(45) Date of Patent: Oct. 13, 2020

(54) METHOD FOR TRANSMITTING AND RECEIVING POWER BY USING HDMI AND DEVICE THEREFOR

(71) Applicant: LG ELECTRONICS INC., Seoul (KR)

(72) Inventors: Jangwoong Park, Seoul (KR); Jingu Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 248 days.

(21) Appl. No.: 15/745,393

(22) PCT Filed: Jul. 15, 2016

(86) PCT No.: PCT/KR2016/007753
§ 371 (c)(1),
(2) Date: Jan. 16, 2018

(87) PCT Pub. No.: WO2017/014506
PCT Pub. Date: Jan. 26, 2017

(65) Prior Publication Data
US 2019/0101966 A1    Apr. 4, 2019

Related U.S. Application Data

(60) Provisional application No. 62/193,590, filed on Jul. 17, 2015.

(51) Int. Cl.
*G06F 1/32* (2019.01)
*G06F 1/26* (2006.01)
(Continued)

(52) U.S. Cl.
CPC ............... *G06F 1/266* (2013.01); *G06F 1/28* (2013.01); *G06F 1/3212* (2013.01)

(58) Field of Classification Search
CPC ................. G06F 1/32; G06F 1/26; G06F 9/44
See application file for complete search history.

(56) References Cited

U.S. PATENT DOCUMENTS

2005/0151511 A1    7/2005  Chary
2011/0239022 A1*   9/2011  Tokoro ................... G06F 1/266
                                                            713/323
(Continued)

FOREIGN PATENT DOCUMENTS

| KR | 10-2012-0135271 A | 12/2012 |
| KR | 10-2013-0074055 A | 7/2013 |
| KR | 10-2015-0081754 A | 7/2015 |

*Primary Examiner* — Keshab R Pandey
(74) *Attorney, Agent, or Firm* — Birch, Stewart, Kolasch & Birch, LLP

(57) ABSTRACT

A method for supplying power performed by a power provider device including a plurality of ports according to an embodiment of the present invention may include providing power to a plurality of power consumer devices through the plurality of ports which is connected to the plurality of power consumer devices through an HDMI cable; detecting a connection release between a first power consumer device among the plurality of power consumer devices and a port; detecting a second power consumer device which is provided with insufficient power currently among the plurality of power consumer devices; notifying remaining supply power levels that are available to additionally supply to the second power consumer device; receiving a request of a power level that the second power consumer device is to receive among the remaining supply power levels; and supplying the power additionally to the second power consumer device as much as the requested power level.

14 Claims, 7 Drawing Sheets

(51) Int. Cl.
G06F 1/28 (2006.01)
G06F 1/3212 (2019.01)

(56) References Cited

U.S. PATENT DOCUMENTS

2014/0103720 A1* 4/2014 Robinson .............. G06F 1/263
 307/38
2016/0191256 A1* 6/2016 Wendt .................. H04L 12/10
 713/300

* cited by examiner

[Fig. 1]
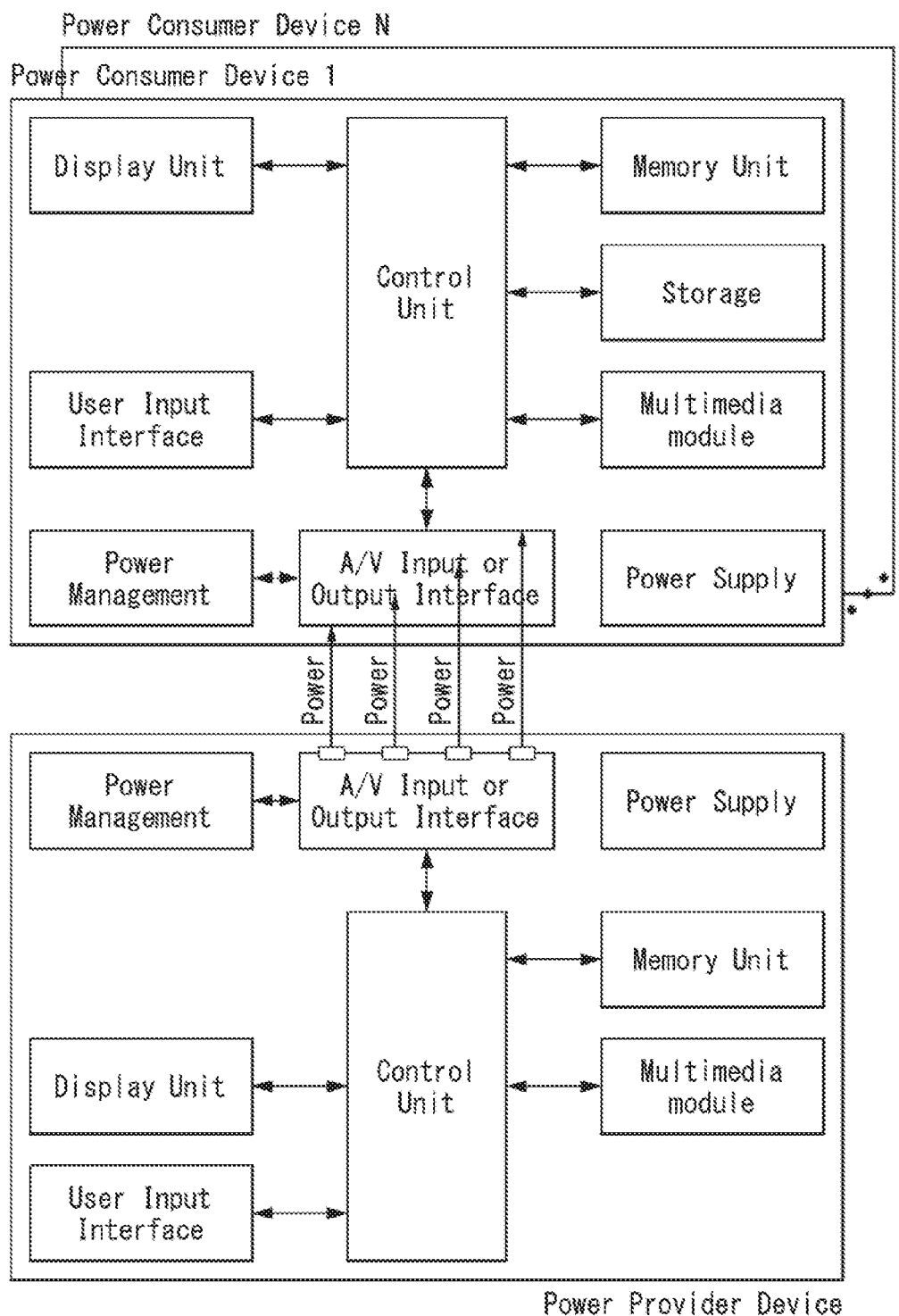

[Fig. 2]
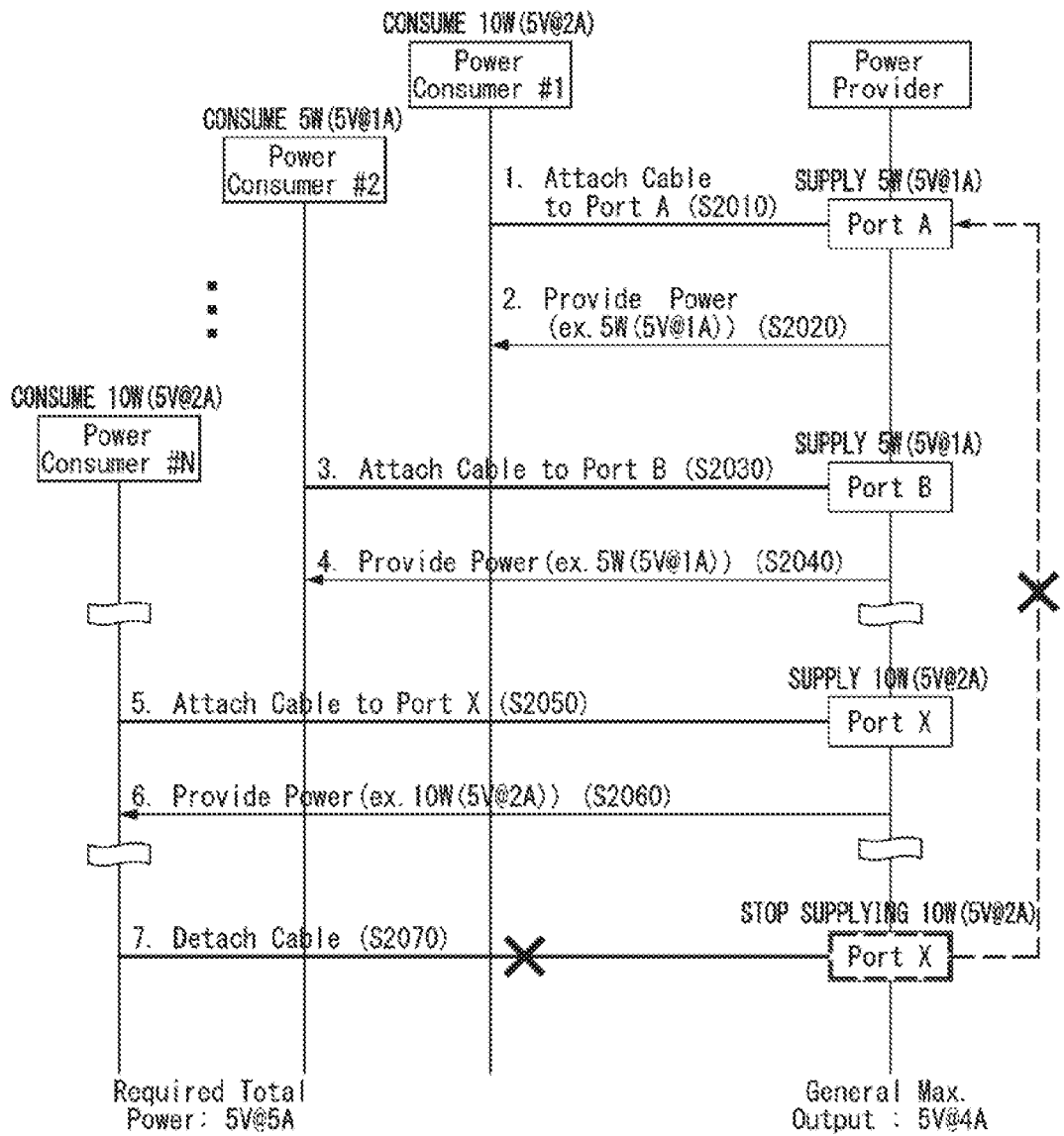

[Fig. 3]
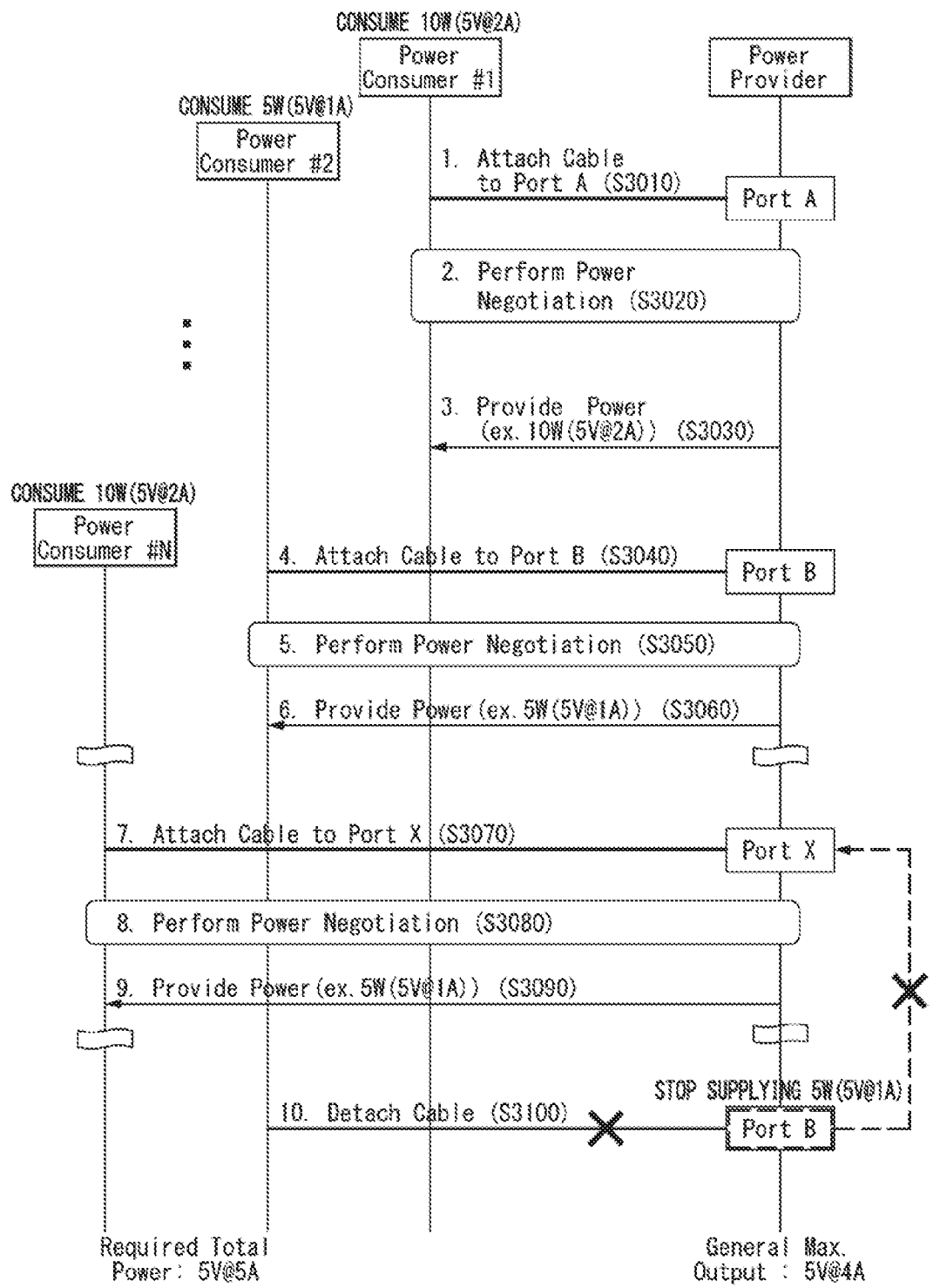

[Fig. 4]
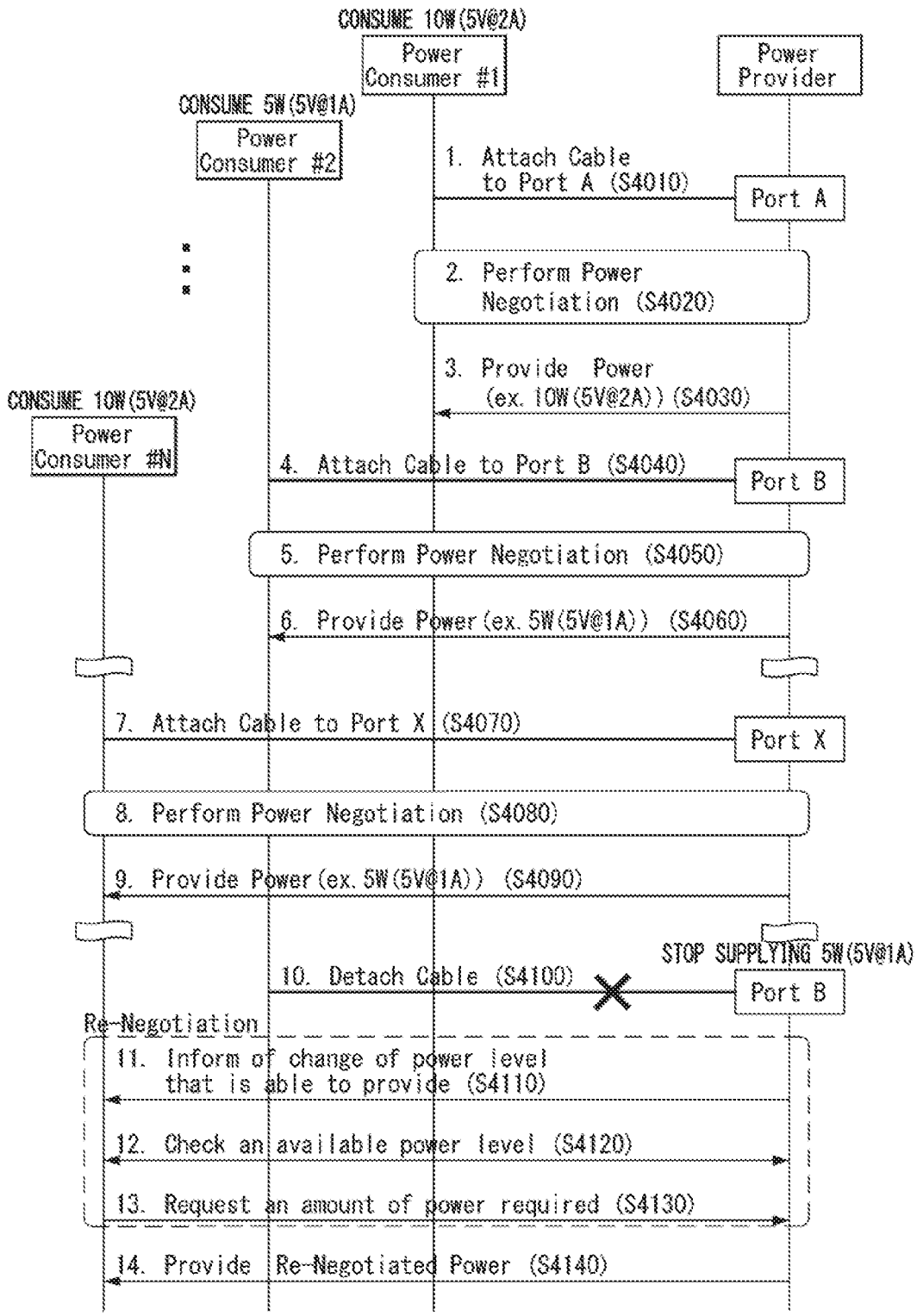

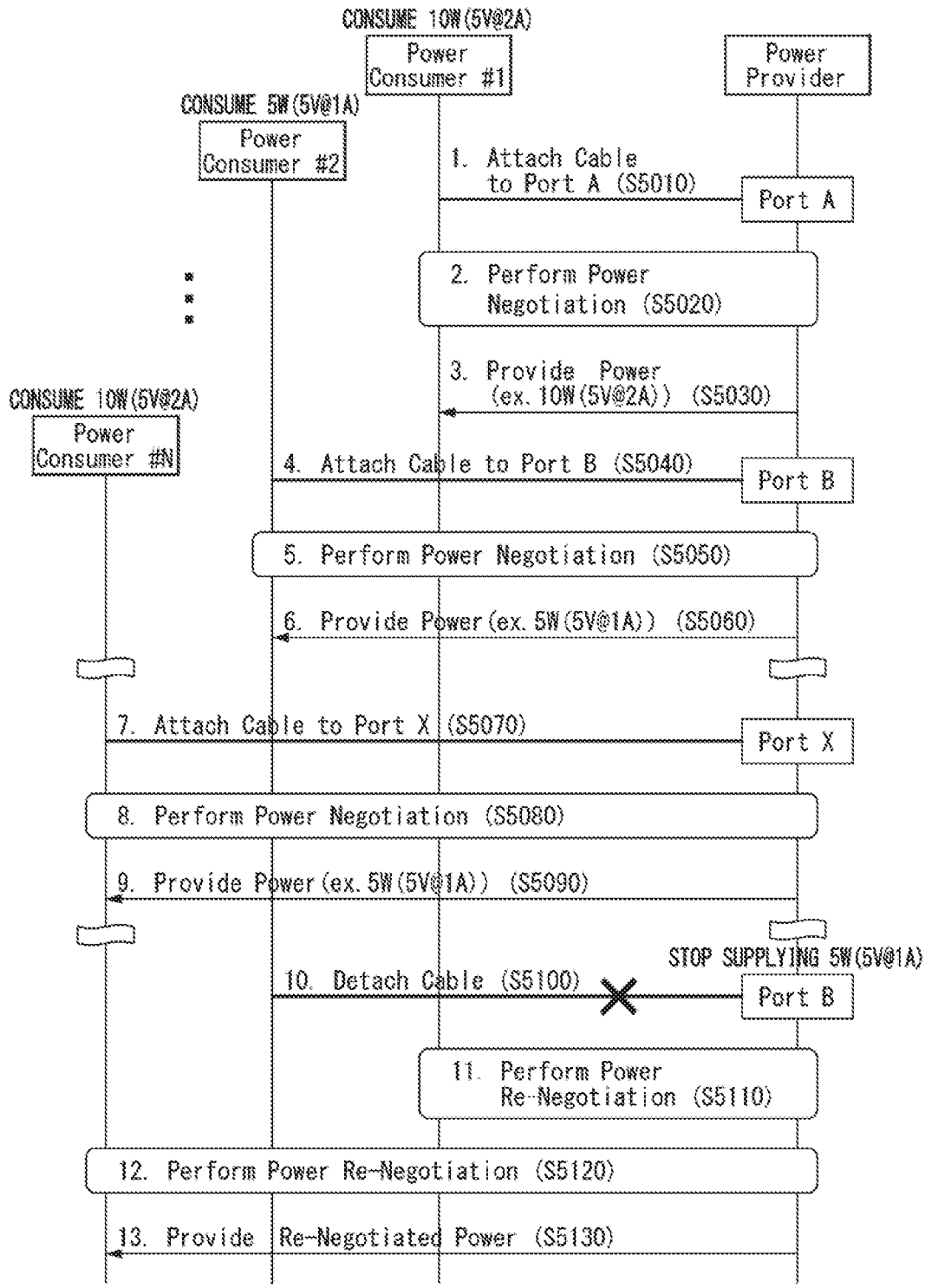

[Fig. 6]
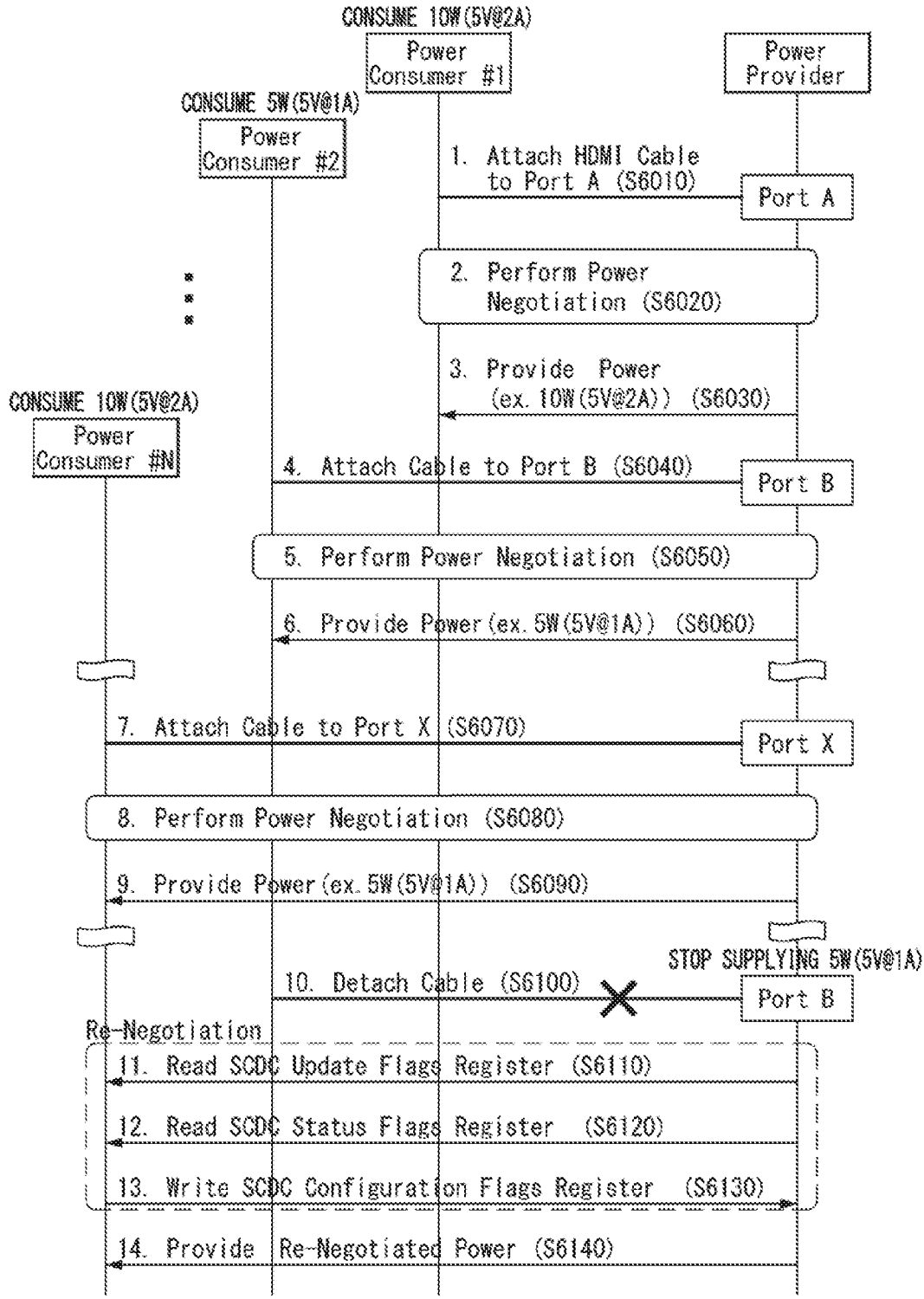

[Fig. 7]

(a) Status Flags Register

| Offset | Bit 7 | Bit 6 | Bit 5 | Bit 4 | Bit 3 | Bit 2 | Bit 1 | Bit 0 |
|---|---|---|---|---|---|---|---|---|
| 0×40 | Rsvd(0) | Rsvd(0) | Rsvd(0) | Rsvd(0) | Ch2_Locked | Ch1_Locked | Ch_0_Locked | Clock_Detected |
| 0×41 | Rsvd(0) | Rsvd(0) | Rsvd(0) | Rsvd(0) | Rsvd(0) | Rsvd(0) | Rsvd(0) | Rsvd(0) |

(b) Configuration Flags Register

| Offset | Bit 7 | Bit 6 | Bit 5 | Bit 4 | Bit 3 | Bit 2 | Bit 1 | Bit 0 |
|---|---|---|---|---|---|---|---|---|
| 0×31 | Rsvd(0) | Rsvd(0) | Rsvd(0) | Rsvd(0) | Rsvd(0) | Rsvd(0) | Rsvd(0) | Rsvd(0) |

METHOD FOR TRANSMITTING AND RECEIVING POWER BY USING HDMI AND DEVICE THEREFOR

CROSS REFERENCE TO RELATED APPLICATIONS

This application is the National Phase of PCT International Application No. PCT/KR2016/007753, filed on Jul. 15, 2016, which claims priority under 35 U.S.C. 119(e) to U.S. Provisional Application No. 62/193,590, filed on Jul. 17, 2015, all of which are hereby expressly incorporated by reference into the present application.

TECHNICAL FIELD

The present invention relates to a method and power provider/consumer device using a High Definition Multimedia Interface (HDMI), and more particularly, to a method and device for efficiently adjusting an amount of power supplied by each of a plurality of ports included in a power provider device.

BACKGROUND ART

An HDMI is an interface/standard that develops a Digital Visual Interface (DVI) which is an interface standard of personal computers and displays for a use of AV electronic products. Since the HDMI transmits video/audio from a player to a display device without compressing it, there is very little latency between a source device and a sink device. And the HDMI has high format compatibility since the HDMI does not require separate decoder chip or software. In addition, the HDMI is available to make wirings between AV devices be simplified, which were complicated because video signals, audio signals and control signals are transmitted on only one cable, and the HDMI provides a High-bandwidth Digital Content Protection (HDCP) technique, thereby providing the copyright protection function.

DISCLOSURE

Technical Problem

The existing high speed wired interface such as Universal Serial Bus (USB) and Mobile High-Definition Link (superMHL) has supported power transmission/supply as well as video and audio data transmission. According to Power Delivery 2.0 standard established in USB-IF (Implementers' Forum), up to maximum 100 W (20V@5 A) is transmittable, and according to superMHL standard established in MHL consortium, up to maximum 40 W (20V@2 A) is transmittable. In addition, a power provider device in which the high speed wired interface is applied may support a plurality of interfaces (connectors or ports) available to supply power.

Previously, both of the total amount of power that a power provider device is able to supply and the amount of power that each interface is able to supply are fixed. That is, the amount of power that each of a plurality of interfaces (connectors or ports) equipped in a power provider device is able to supply is fixed to a predetermined value, but unable to be adjusted changeably.

As a result, previously, there exists a restriction that an interface which is currently supplying power is unable to draw remaining supply power available to be supplied in a part of interfaces that is not supplying power currently and supply it to a power consumer device. Such a power supply mechanism is very limited and inefficient, and there is a problem that long times are required to complete power charge of a power consumer device and this causes inconvenience of a user.

Technical Solution

In order to solve the technical problem, a method for supplying power performed by a power provider device including a plurality of ports according to an embodiment of the present invention may include providing power to a plurality of power consumer devices through the plurality of ports which is connected to the plurality of power consumer devices through a High Definition Multimedia Interface (HDMI) cable; detecting a connection release between a first power consumer device among the plurality of power consumer devices and a port; detecting a second power consumer device which is provided with insufficient power currently among the plurality of power consumer devices; notifying remaining supply power levels that are available to additionally supply to the second power consumer device; receiving a request of a power level that the second power consumer device is to receive among the remaining supply power levels; and supplying the power additionally to the second power consumer device as much as the requested power level.

In addition, the second power consumer device which is supplied with insufficient power currently may correspond to a power consumer device which is supplied with power in smaller power level than a power level which is available to receive.

In addition, when a power level indicated by SCDC status flag register is different from a power level indicated by SCDC configuration flag register, detecting the second power consumer device may be performed by detecting a power consumer device which is a target of a power level indicated by the SCDC configuration flag register as the second power consumer device.

In addition, when detecting a plurality of the second power consumer devices, supplying the power additionally to the second power consumer device may include supplying the power additionally sequentially according to the requested power level by the plurality of the second power consumer devices.

In addition, the remaining supply power level may be a same as a power level which has been supplied to the released first power consumer device.

In addition, notifying remaining supply power levels that are available to additionally supply to the second power consumer device may include updating Status and Control Data Channel (SCDC) update flag register.

In addition, notifying remaining supply power levels that are available to additionally supply to the second power consumer device may further include writing the remaining supply power level that is available to additionally supply in the SCDC status flag register; and transmitting the written remaining supply power level to the second power consumer device.

In addition, receiving a request of a power level that the second power consumer device is to receive among the remaining supply power levels may include receiving an SCDC write message including power level information to be received by the second power consumer device from the second power consumer device; and writing a power level included in the received SCDC write message in SCDC configuration flag register.

In addition, a power provider device for supplying power to a plurality of power consumer devices according to another embodiment of the present invention may include a plurality of ports configured to transmit and receive data, which is connected to a plurality of power consumer devices through a High Definition Multimedia Interface (HDMI) cable; a power control unit configured to control power supply through the HDMI; and a control unit configured to control the plurality of ports and the power control unit, wherein the power provider device may be configured to: supply power to the plurality of power consumer devices through the plurality of ports, detect a connection release between a first power consumer device among the plurality of power consumer devices and a port, detect a second power consumer device which is provided with insufficient power currently among the plurality of power consumer devices, notify remaining supply power levels that are available to additionally supply to the second power consumer device, receive a request of a power level that the second power consumer device is to receive among the remaining supply power levels, and supply the power additionally to the second power consumer device as much as the requested power level.

In addition, the second power consumer device which is supplied with insufficient power currently may correspond to a power consumer device which is supplied with power in smaller power level than a power level which is available to receive.

In addition, when a power level indicated by SCDC status flag register is different from a power level indicated by SCDC configuration flag register, the power provider device detects the second power consumer device may be further configured to detect a power consumer device which is a target of a power level indicated by the SCDC configuration flag register as the second power consumer device.

In addition, the power provider device may be further configured to supply the power additionally sequentially according to the power level requested by the plurality of the second power consumer devices.

In addition, the remaining supply power level may be same as a power level which has been supplied to the released first power consumer device.

In addition, the power provider device may be further configured to notify the power level that is available to additionally supply to the second power consumer device by updating Status and Control Data Channel (SCDC) update flag register.

In addition, the power provider device may be further configured to write the remaining supply power level that is available to additionally supply in the SCDC status flag register, and transmit the written remaining supply power level to the second power consumer device.

In addition, the power provider device may be further configured to receive an SCDC write message including power level information that the second power consumer device is going to receive from the second power consumer device, and write a power level included in the received SCDC write message in SCDC configuration flag register.

Technical Effects

According to the present invention, power transmission and reception between a power provider device and a power consumer device is available through an HDMI cable, and it is available to supply power of a power consumer device without any separate cable connection.

In addition, according to the present invention, a power provider device distributes a remaining amount of supply power generated by an inactivated port to other port changeably in real time, and accordingly, a power consumer device which is provided with insufficient power is able to be supplied with sufficient power. Consequently, the time for charging a power consumer device may be reduced, and there is an advantage that a user is not required to check the remaining amount of supply power of a power provider device or check an amount of power supplied through each port one by one.

Further, the beneficial effect of the present invention will be described in detail in the Best Mode for Invention.

DESCRIPTION OF DRAWINGS

FIG. 1 is a block diagram illustrating an HDMI system according to an embodiment of the present invention.

FIG. 2 is a flowchart for a power supply method of a power provider device according to a first conventional art.

FIG. 3 is a flowchart for a power supply method of a power provider device according to a second conventional art.

FIG. 4 is a flowchart for a dynamic power allocation method through a unicast power re-negotiation according to an embodiment of the present invention.

FIG. 5 is a flowchart for a dynamic power allocation method through a broadcast power re-negotiation according to an embodiment of the present invention.

FIG. 6 is a flowchart for a dynamic power allocation method through a unicast power re-negotiation according to an embodiment of the present invention.

FIG. 7 is a diagram illustrating SCDC status flag register and SCDC configuration flag register according to an embodiment of the present invention.

BEST MODE FOR INVENTION

Although the terms used in the present specification are selected as general terms which are currently used widely as possible while considering functions in the present specification, the terms may be changed according to intentions of those skilled in the art, practices and advents of new techniques. In addition, in a special case, a term is discretionally selected by the applicant. In this case, the meaning of the term will be described in the corresponding embodiment of the detailed description. Accordingly, the terms used in the present specification should be interpreted based on the substantive meanings of the terms and based on the description throughout the present specification, not based on simple nominal terms.

Further, the embodiments will be described in detail by reference to the accompanying drawings and the contents shown in the accompanying drawings, but the present invention is not restricted or limited to the embodiments.

Hereinafter, the preferred embodiment of the present invention will be described in more detail by reference to the accompanying drawings.

FIG. 1 is a block diagram illustrating an HDMI system according to an embodiment of the present invention. Hereinafter, the devices that transmit and receive video/audio/control data using the HDMI will be collectively referred to the HDMI system.

Referring to FIG. 1, an HDMI system may include a power provider device and at least one power consumer device 1 to N. Here, between the power provider device and the power consumer device, in the HDMI system, a device that transmits video/audio data through the HDMI may correspond to the source device, and a device that receives video/audio data through the HDMI may correspond to the sink device. At the moment, as physical devices for supporting data transmission and reception by connecting two devices, HDMI cables and connectors may be provided.

The power provider device may correspond to a device that supplies power to the power consumer device. In addition, the power provider device may correspond to a device that transmits a request message for instructing a specific command to the power consumer device or processes a specific command by receiving a request message from the power consumer device. Furthermore, the power provider device may correspond to a display device for processing and forwarding a response message transmitted from the power consumer device to a user after transmitting the request message, and providing/displaying a User Interface (UI) for receiving a command from the user. In addition, the power provider device may correspond to a physical device that provides contents rendering to a user by receiving contents or streaming from the power consumer device.

The power consumer device may correspond to a device supplied with power from the power provider device. The power consumer device may correspond to a device that transmits a request message for instructing a specific command to the power provider device or processes a specific command by receiving a request message from the power provider device. Furthermore, the power consumer device may correspond to a display device for processing and forwarding a response message transmitted from the power provider device to a user after transmitting the request message, and providing/displaying a UI for receiving a command from the user. In addition, the power consumer device may correspond to a physical device that provides contents rendering to a user by receiving contents or streaming from the power provider device.

The HDMI cables and the connectors may perform pairing of four channels that provides a Transition Minimized Differential Signaling (TMDS) data channel and a TMDS clock channel. The TMDS data channels may be used for forwarding video data, audio data and auxiliary data.

In addition, the HDMI system provides a Video Electronics Standards Association (VESA) Display Data Channel (DDC). The DDC is used for a configuration between a source device and a sink device and a status information exchange. A CEC protocol may provide a high-level control function between various audio visual products of user environments, and may be optionally used. Further, an optional HDMI Ethernet Channel (HEC) may provide an Ethernet compatible data networking between audio return channel and the connected devices in an opposite direction from the TMDS.

Video data, audio data and supplementary data may be transmitted and received through three TDMS data channels. Commonly, a TMDS clock runs a video pixel rate, and is transmitted through a TMDS clock channel. The TMDS clock may be used as a reference frequency for data recovery in three TMDS data channels in an HDMI receiver. In a source device, the data of 8 bits per TMDS data channel may be transformed into a sequence of 10 bits of which transition is minimized, which is DC balanced, and transmitted in serial manner with a rate of 10 bits per TMDS clock period.

In order to transmit audio data and supplementary data through the TMDS channel, the HDMI uses a packet structure. In order to attain high reliability for audio data and control data, data may be transmitted in word of 10 bits which is generated by using a BCH error correction code and an error reduction coding.

A utility line may be used for an optional extension function such as HEAC.

The power provider device includes at least one of a display unit, a user input interface unit, a control unit (e.g., processor), Audio/Video (AN) input and output interface (or network interface), a memory unit, a multimedia module, a power control/management unit (e.g., power controller) and a power supply unit.

The power consumer device includes at least one of a display unit, a user input interface unit, a control unit, A/V input and output interface (or network interface), a memory unit, a storage unit, a multimedia module, a power control unit and a power supply unit.

The display unit may display data or contents received through the HDMI, data and UI stored in the memory unit, and the like by control of the control unit.

The user input interface unit may receive an action or an input of a user. As an embodiment, the user input interface unit may correspond to a remote controller, a voice receiving/detecting device, a touch input sensing/receiving device, and so on.

The control unit may control general operations of each device. Particularly, the control unit may perform a communication between the units included in the respective devices, and may control the operation of each of the devices.

The A/V input and output interface (or network interface) is a unit for transmitting and receiving A/V data and/or power through HDMI, and performs transmission and reception of various data including a command between devices, a request, an action, a response, and the like as well as the A/V data and/or the power. The A/V input and output interface may be referred to as a connector or a port.

A plurality of the A/V input and output interfaces may be provided in the power provider device or the power consumer device and in the present disclosure, an amount of power that each A/V input and output interface may provide may be changed flexibly according to an embodiment. More detailed description for it will be described below in relation to FIG. 4 to FIG. 7.

The memory unit refers to volatile physical devices that may store various types of data temporarily.

The storage unit refers to non-volatile physical devices that may store various types of data.

Both of the memory unit and the storage unit may play the role of storing data, and both of these may be collectively called a memory unit.

The multimedia module may play various types of multimedia. The multimedia module may be implemented separately with the control unit, or implemented as an integral physical component with the control unit.

The power supply unit may supply power required to operate the power provider device, the power consumer device and units included in these elements.

The power control unit may manage and control power transmission and reception between devices through the A/V input and output interface.

The units except the A/V input and output interface and the control unit among the units described above may be included in the power provider device or the power consumer device, selectively according to an embodiment, and may not correspond to essential component units.

Previously, each of the total amount of power that a power provider device is able to supply and the amount of power that each interface is able to supply is fixed to a predetermined value. That is, the amount of power that each of a plurality of interfaces (connectors or ports) equipped in a power provider device is able to supply is fixed to a predetermined value, but unable to be adjusted changeably. As a result, an interface which is currently supplying power is unable to draw remaining supply power available to be supplied in a part of interfaces that is not supplying power currently and supply it to a power consumer device. Such a power supply operation of a power provider device is very limited and inefficient, and there is a problem that long times are required to complete power charge of a power consumer device and this causes inconvenience of a user.

Accordingly, the present disclosure is to provide a more efficient power supply mechanism that each of a plurality of interfaces may adjust an amount of power that may be provided to a power consumer device changeably.

Hereinafter, the problem of the conventional art is described first, and then the efficient power supply mechanism for solving the problem will be described below.

Meanwhile, in the present disclosure, an amount of power may be referred to as 'power level'.

FIG. 2 is a flowchart for a power supply method of a power provider device according to a first conventional art.

In the flowchart, it is assumed that total three ports (port A, port B and port X) available to supply power are existed in a power provider device, and total power of 20 W may be provided to a power consumer device. In this case, it is assumed that ports A/B provide 5 W (5V@1 A) and port X provides 10 W (5V@2 A). Furthermore, it is assumed that the power provider device provides power to total three power consumer devices (first, second and $N^{th}$ power consumer devices), and the first and $N^{th}$ power consumer devices are able to receive (or consume) power of maximum 10 W (5V@2 A) and the second power consumer devices is able to receive (or consume) power of maximum 5 W.

Referring to FIG. 2, first, the power provider device may be attached to a (HDMI) cable through port A and connected with the first power consumer device (step, S2010). Next, the power provider device may supply 5 W which is the amount of power of port A to the first power consumer device through the attached cable (step, S2020).

Similarly, the power provider device may be attached to a (HDMI) cable through port B and connected with the second power consumer device (step, S2030), and the second power consumer device may be provided with 5 W which is the amount of power of port B from the power consumer device (step, S2040). In addition, the power provider device may be attached to a (HDMI) cable through port X and connected with the $N^{th}$ power consumer device (step, S2050), and the $N^{th}$ power consumer device may be provided with 10 W which is the amount of power of port B from the power consumer device (step, S2060).

At this time, the attachment between the $N^{th}$ power consumer device and/or port X and the (HDMI) cable may be released (i.e., a connection between the $N^{th}$ power consumer device and port X may be released) (step, S2070). In this case, the power provider device may stop the power supply of 10 W to the $N^{th}$ power consumer device through port X. In other words, port X may be inactivated owing to the connection release with the $N^{th}$ power consumer device, and consequently, the remaining supply power that the power provider device is available to provide may be 10 W. However, in the conventional art, since the amount of power that the power provider device is available to provide through each port is fixed, the power provider device is unable to additionally supply the remaining supply power to a power consumer device which is connected through other port.

For example, in the flowchart, the first power consumer device is provided with power of only 5 W through port A even though the first power consumer device may be provided with power of 10 W. However, since the amount of power that the power provider device is available to provide through port A is fixed to 5 W, the power provider device is unable to provide 5 W among the remaining supply power 10 W to the first power consumer device through port A additionally.

As such, since the amount of remaining power supply of an inactivated port is unable to be distributed to other port in the conventional art, there is a problem that a power consumer device that requires more power supply is unable to be provided with sufficient amount of power. Owing to this, in the case that a power consumer device is driven with battery charge at the same time, there is a problem that there is a certain restriction (e.g., decrease of display brightness, etc.) in driving and slow battery charge.

FIG. 3 is a flowchart for a power supply method of a power provider device according to a second conventional art.

In the flowchart, it is assumed that total three ports (port A, port B and port X) available to supply power are existed in a power provider device, and total power of 20 W may be provided to a power consumer device. It is assumed that ports A/B/X provide power in a level which is negotiated with the power consumer device. Furthermore, it is assumed that the power provider device provides power to total three power consumer devices (first, second and $N^{th}$ power consumer devices), and the first and $N^{th}$ power consumer devices are able to receive (or consume) power of maximum 10 W (5V@2 A) and the second power consumer devices is able to receive (or consume) power of maximum 5 W.

Referring to FIG. 3, first, the power provider device may be attached to a (HDMI) cable through port A and connected with the first power consumer device (step, S3010). Next, the power provider device may negotiate an amount of power which is going to supply through port A with the first power consumer device (step, S3020). More particularly, the power provider device may match the amount of power which is the first power consumer device is intended to be supplied with the amount of power that the power provider device itself is available to provide with each other, and may determine the amount of power matched with each other to the amount of power to supply to the first power consumer device. In this case, the power provider device and the first power consumer device may negotiate the amount of supply power using a Status and Control Data Channel (SCDC) (or referred to as SCDC Structure (SCDCS)), and this will be described in detail below in relation to FIGS. 6 and 7. Next, the power provider device may supply power with the amount of power (10 W (5V@2 A)) through port A, which is negotiated with the first power consumer device (step, S3030).

Similarly, the power provider device may be attached to a (HDMI) cable through port B and connected with the second power consumer device (step, S3040), and may negotiate the amount of power to supply with the second power consumer device (step, S3050) and may provide the negotiated amount of power (5 W (5V@1 A)) through connected port B to the second power consumer device (step, S3060). In addition, the power provider device may be attached to a (HDMI) cable through port X and connected with the $N^{th}$ power consumer device (step, S3070), and may negotiate the amount of power to supply with the $N^{th}$ power consumer device (step, S3080) and may provide the negotiated amount of power (5 W (5V@1 A)) through connected port X to the $N^{th}$ power consumer device (step, S3090).

At this time, the attachment between the second power consumer device and/or port B and the (HDMI) cable may be released (i.e., a connection between the second power consumer device and port B may be released) (step, S3100). In other words, the power provider device may detect that the attachment between the second power consumer device and port B is released. In this case, the power provider device may stop the power supply of 5 W to the second power consumer device through port B. In other words, port B may be inactivated owing to the connection release with the second power consumer device, and consequently, the remaining supply power that the power provider device is available to provide may be 5 W. However, in the conventional art, since the amount of power that the power provider device is available to provide through each port is fixed to the amount of power which is negotiated with the power consumer device, the power provider device is unable to additionally supply the remaining supply power to a power consumer device which is connected through other port.

As such, since the amount of remaining power supply of an inactivated port is unable to be distributed to other port in the conventional art, there is a problem that a power consumer device that requires more power supply is unable to be provided with sufficient amount of power. Owing to this, in the case that a power consumer device is driven with battery charge at the same time, there is a problem that there is a certain restriction (e.g., decrease of display brightness, etc.) in driving and slow battery charge.

Referring to FIGS. 2 and 3, since the power provider device has no choice but to distribute the remaining supply power of an inactivated port to other port changeably, the power supply scheme is inefficient. Accordingly, the present disclosure provides an efficient power supply mechanism that a power provider is available to provide power by distributing remaining supply power to an activated port changeably.

FIG. 4 is a flowchart for a dynamic power allocation method through a unicast power re-negotiation according to an embodiment of the present invention.

In the flowchart, steps S4010 to S4100 correspond to steps S3010 to S3100 of FIG. 3, and the detailed description for steps S3010 to S3100 may be identically/similarly applied to steps S4010 to S4100. Hereinafter, the difference between the present invention and the conventional art is mainly described.

Referring to FIG. 4, a power provider device may detect remaining supply power of 5 W to be occurred when port B is inactivated through step S4100. In this case, the power provider device may detect a power consumer device which is provided with smaller amount of power currently than the amount of power requested to the power provider device, and may notify that the amount of power that the power provider device is able to supply is changed to the corresponding power consumer device (step, S4110).

For example, in the flowchart, $N^{th}$ power consumer device is provided with power of 5 W from port X although the $N^{th}$ power consumer device is available to receive power of 10 W. The power provider device may detect such $N^{th}$ power consumer device and may notify that the amount of power that the power provider device is able to supply is changed to the $N^{th}$ power consumer device.

In this case, in order to identify the power consumer device which is provided with smaller amount of power currently than the amount of power requested, the power provider device may use Status Flag register and/or Configuration Flags register in SCDCS stored in the power provider device or the power consumer device, and this will be described in detail below in relation to FIGS. 6 and 7.

The power provider device may notify that the amount of power that the power provider device is able to supply is changed and the particular amount of power that the power provider device itself is able to supply (e.g., remaining amount of supply power=5 W) to the $N^{th}$ power consumer device.

Next, the $N^{th}$ power consumer device may identify how much amount of power the power provider device may supply to itself through step S4110 (step, S4120).

Then, the $N^{th}$ power consumer device may request the amount of power that the $N^{th}$ power consumer device itself is intended to be provided among the remaining amount of supply power that the power provider device is able to supply to the power provider device (step, S4130). In this time, the $N^{th}$ power consumer device may request the amount of power that the $N^{th}$ power consumer device itself is intended to be provided by transmitting information for an amount of power intended to be additionally provided or a maximum/total amount of power intended to be provided to the power provider device.

For example, since the $N^{th}$ power consumer device is available to receive power of 10 W and is currently receiving power of 5 W from port X, the $N^{th}$ power consumer device may request to provide power of 5 W additionally among the remaining amount of supply power to the power provider device. Alternatively, since the $N^{th}$ power consumer device is available to receive power of 10 W, the $N^{th}$ power consumer device may request to provide power of 10 W. In this case, the power provider device may provide power additionally as much as the difference between the amount of power that the $N^{th}$ power consumer device requested and the amount of power currently provided through port X to the $N^{th}$ power consumer device.

Steps S4110 to S4130 described above may be referred to as "re-negotiation step".

Finally, the power provider device may provide power to the $N^{th}$ power consumer device with the amount of power as much as negotiated with the $N^{th}$ power consumer device through steps S4110 to S4130. Accordingly, the power provider device supplies power of total 10 W to the $N^{th}$ power consumer device through port X.

In this embodiment, the power provider device directly detects the power consumer device which is provided with smaller power than the requested power and performs one-to-one re-negotiation of power with the corresponding power consumer device, and this may be referred to as "unicast power re-negotiation method".

FIG. 5 is a flowchart for a dynamic power allocation method through a broadcast power re-negotiation according to an embodiment of the present invention.

In the flowchart, steps S5010 to S5100 correspond to steps S3010 to S3100 of FIG. 3, and the detailed description for steps S3010 to S3100 may be identically/similarly applied to steps S5010 to S5100. Hereinafter, the difference between the present invention and the conventional art is mainly described.

Referring to FIG. 5, a power provider device may detect remaining supply power of 5 W to be occurred when port B is inactivated through step S5100.

In this case, the power provider device may re-negotiate an amount of supply power with all power consumer devices that are provided with power currently. That is, in the case of the flowchart, the power provider device may re-negotiate an amount of supply power with a first power consumer device which is currently provided with power through port A and an $N^{th}$ power consumer device through port X.

For this, the power provider device may perform the re-negotiation step (steps S4110 to S4130) performed in FIG. 4 together with the first and $N^{th}$ power consumer devices (steps, S5110 and S5120).

More particularly, the power provider device may notify that the amount of power that the power provider device is able to supply is changed and the particular amount of power that the power provider device itself is able to supply (e.g., remaining amount of supply power=5 W) to each of the first and $N^{th}$ power consumer devices. Through this, the first and $N^{th}$ power consumer devices may identify how much amount of power the power provider device may supply to themselves.

Next, the first and/or $N^{th}$ power consumer devices may request the amount of power that the $N^{th}$ power consumer device itself is intended to be provided among the remaining amount of supply power that the power provider device is able to supply to the power provider device. In this time, the first and/or $N^{th}$ power consumer devices may request the amount of power that the first and/or $N^{th}$ power consumer devices are intended to be provided by transmitting information (hereinafter, referred to as 'power request information') for an amount of power intended to be additionally provided or a maximum/total amount of power intended to be provided to the power provider device.

In the flowchart, since the first power consumer device is properly provided with power as much as the amount of power requested to the power provider device, the first power consumer device may not transmit the power request information to the power provider device separately. Since the $N^{th}$ power consumer device is currently provided with power insufficiently as much as 5 W, the $N^{th}$ power consumer device may transmit the power request information indicating 5 W as the amount of power intended to be provided additionally or 10 W as the information of a maximum/total amount of power intended to be provided to the power provider device.

Finally, the power provider device may provide power to the $N^{th}$ power consumer device with the amount of power as much as re-negotiated with the $N^{th}$ power consumer device through steps S5120. Accordingly, the power provider device supplies power of total 10 W to the $N^{th}$ power consumer device additionally through port X (or supplies power of total 5 W to the $N^{th}$ power consumer device additionally through port X).

In this embodiment, the power provider device performs one-to-one power re-negotiation with all of the power consumer devices that are currently provided with power, and this may be referred to as "broadcast power re-negotiation method".

Although it is not shown in the flowchart, in the case that there is a plurality of power consumer devices that requires additional power supply, the power provider device may set a priority based on the amount of power that each of the power consumer devices requests additionally, and may provide additionally power sequentially from the power consumer device of which priority is high. For example, the power provider device may set a priority in an descending order of the amount of power that is additionally requested, and may provide the amount of power requested by the corresponding power consumer device sequentially among the remaining amount of supply power from the power consumer device of which priority is high.

FIG. 6 is a flowchart for a dynamic power allocation method through a unicast power re-negotiation according to an embodiment of the present invention. FIG. 7 is a diagram illustrating SCDC status flag register and SCDC configuration flag register according to an embodiment of the present invention.

The flowchart of FIG. 6 is a flowchart for a particular embodiment of the flowchart shown in FIG. 4, and is a flowchart for a dynamic power allocation method using SCDC. Accordingly, in this flowchart, the description described in relation to FIG. 4 may be identically applied.

In the flowchart, steps S6010 to S6100 correspond to steps S3010 to S3100 of FIG. 3, and the detailed description for steps S3010 to S3100 may be identically/similarly applied to steps S6010 to S6100. In addition, steps S6100 to S6140 correspond to steps S4110 to S4140 of FIG. 4, and the detailed description for steps S4110 to S4140 may be identically/similarly applied to steps S6100 to S6140. Hereinafter, the difference between the present invention and the flowchart of FIG. 4 is mainly described.

Referring to FIG. 6, a power supplier device may notify that a specific event/update occurs (i.e., remaining supply power occurs) currently in an $N^{th}$ power consumer device by generating/transmitting a read request signal. The $N^{th}$ power consumer device that receives/detects the read request signal may identify that a power supply state of the power provider device is changed by accessing SCDC update flag register and reading the corresponding register value (step, S6110). Here, the SCDC update flag register is an SCDC register notifying that an update occurs in SCDC, and may be stored in the power provider device or the $N^{th}$ power consumer device.

Next, in order to identify the amount of power (or total amount of power that is able to be supplied) that the power provider device is able to supply additionally, the $N^{th}$ power consumer device may access SCDC status flag register and read the corresponding register value. Here, the SCDC status flag register is an SCDC register indicating a status (or power supply capability) of the power provider device, and may be stored in the power provider device or the $N^{th}$ power consumer device.

FIG. 7(a) is a diagram illustrating SCDC status flag register according to an embodiment of the present invention.

Referring to FIG. 7(a), Bit 4 to 7 of offset 0x40 included in the SCDC status flag register may be used for indicating an additional amount of power (or total amount of power that is able to be supplied) that the power provider device is able to supply additionally when performing the power re-negotiation step.

In this case, each bit of Bit 4 to 7 of offset 0x40 may indicate an additional amount of power (or total amount of power). For example, each of Bit 4 to 7 may correspond to 5 W, 10 W, 15 W and 20 W, respectively, and the bit value of the bit that corresponds to the additional amount of power that the power provider device is able to provide may be set to '1'. Accordingly, when Bit 4 to 7 is set to '1000', the power consumer device may identify that the power provider device may supply additional power of 5 W.

Alternatively, a bit value of Bit 4 to 7 of offset 0x40 may indicate an additional amount of power (or total amount of power). For example, when Bit 4 to 7 is set to '0101 (=1*2^2+1*2^0=5)', the power consumer device may identify that the power provider device may supply additional power of 5 W.

Bit 0 to 7 of offset 0x41 included in the SCDC status flag register may be used for indicating an amount of power that the power provider device is able to provide through the port connected with the power consumer device when performing the power negotiation step. The scheme of indication may be the same as the scheme of indicating the additional amount of power of the power consumer device described above, that is, each bit may indicate a specific amount of power or a bit value may indicate a specific amount of power.

Referring to FIG. 6 again, according to the configuration of the SCDC status flag register described above, the power provider device may write 5 W as an amount of power which is able to be additionally supplied in Bit 4 to 7 in offset 0x40 (or write 10 W as a total amount of power which is able to be supplied), and the $N^{th}$ power consumer device may identify that the power provider device is capable of providing 5 W additionally to the power consumer device by reading the corresponding register.

Next, the $N^{th}$ power consumer device may write the additional amount of power (or total amount of power) that the $N^{th}$ power consumer device is intended to be provided with in the SCDC configuration flag register (step, S6130). Here, the SCDC configuration flag register is an SCDC register indicating a status (or power reception capability) of the power provider device, and may be stored in the power provider device or the $N^{th}$ power consumer device.

FIG. 7(b) is a diagram illustrating SCDC configuration flag register according to an embodiment of the present invention.

Referring to FIG. 7(b), Bit 0 to 7 of offset 0x31 included in the SCDC configuration flag register may be used for indicating an additional amount of power (or total amount of power that is able to be received) that a power consumer device is able to receive additionally when performing the power re-negotiation step. Bit 0 to 7 of offset 0x31 may also be used for indicating the amount of power (or amount of reception power) that the power consumer device is intended to receive. The scheme of indication may be the same as the scheme of indicating the additional amount of power of the power consumer device described above, that is, each bit may indicate a specific amount of power or a bit value may indicate a specific amount of power.

Referring to FIG. 6 again, according to the configuration of the SCDC configuration flag register described above, the $N^{th}$ power consumer device may write 5 W as an amount of power which is able to receive additionally (or write 10 W as a total amount of power which is able to receive) in Bit 0 to 7 in offset 0x31 of the SCDC configuration flag register, and may identify that the $N^{th}$ power consumer device requests power supply of 5 W additionally by reading the corresponding register. For this, the $N^{th}$ power consumer device may transmit an SCDC write message for writing 5 W in the SCDC configuration flag register.

Finally, the power provider device may provide power of 5 W which is re-negotiated with the $N^{th}$ power consumer device to the $N^{th}$ power consumer device through port X (step, S6140).

As such, the power re-negotiation step using SCDC may be identically/similarly applied to the dynamic power allocation method through "broadcast" power re-negotiation as well as the dynamic power allocation method through unicast power re-negotiation as shown in the flowchart. Accordingly, in the flowchart of FIG. 5, the power provider device may re-negotiate the amount of power to supply by performing steps S6110 to S6130 by using the SCDC register with the first and $N^{th}$ power consumer devices.

Meanwhile, the unit of amount of power indicated by register in the embodiment of FIGS. 7(a) and 7(b) is Watt (W), but not limited thereto, and may also be represented as a unit of Volt (V) in the corresponding registers when a current is fixed to a specific value.

In addition, the power provider device may perform step S4110 of FIG. 4 by using the SCDC status flag register of FIG. 7(a) and the SCDC configuration flag register of FIG. 7(b). More particularly, the power provider device may compare the amount of power indicated by offset 0x41 of the SCDC status flag register with the amount of power indicated by offset 0x31 of the SCDC configuration flag register, and detect the power consumer device which is provided with insufficient power currently. For example, in the case that the amounts of power indicated by two registers are different, the power provider device may detect the power consumer device which is a target of the amount of power indicated by the corresponding SCDC configuration flag register as the power consumer device which is provided with insufficient power currently. This is because by offset 0x41 of the SCDC status flag register indicates the amount of supply power of the power provider device and offset 0x31 of the SCDC configuration flag register indicates the amount of reception power of the power consumer device, as described above.

Accordingly, the power provider device may compare the amounts of power indicated by two registers for each power consumer device and detect the power consumer device that has different SCDC configuration flag register as the power consumer device which is provided with insufficient power. In other words, the power provider device may compare two registers for each power consumer device and identify whether the amount of reception power is greater than the amount of supply power, and detect the power consumer device of which amount of reception power is greater as the power consumer device which is provided with insufficient power.

According to the embodiment of FIGS. 4 to 6, the power provider device distributes the remaining amount of supply power generated by an inactivated port to other port changeably in real time, and accordingly, a power consumer device which is provided with insufficient power is able to be supplied with sufficient power. Consequently, the time for charging a power consumer device may be reduced, and there is an advantage that a user is not required to check the remaining amount of supply power of a power provider device or check an amount of power supplied through each port one by one.

Followings are contents of arranging/summarizing the embodiments proposed in the present disclosure briefly.

1. Dynamic Power Allocation Through Unicast Power Re-Negotiation

When a power provider device detects an inactivated interface among the interfaces through which power supply is available, through the interface connected to a power consumer device that requires additional power supply, the power provider device notifies that additional power supply is available to the corresponding power consumer device. The corresponding power consumer device identifies the amount of power available to be supplied through the corresponding interface of the power provider device and requests the required amount of power consumption. The power provider device supplies the requested amount of power to the corresponding power consumer device.

In the case that this is applied to the HDMI interface, when a power provider device detects a port of which status is changed from an activated state to an inactivated state, the power provider device transmits a readout request signal to a corresponding power consumer device through the port of the power provider device through which the power consumer device that requires additional power supply is required is connected. The power consumer device that detects the signal read the SCDC update flag register value and may identify that there is a change in the power supply state of the power provider device. By reading the SCDC status flag register value, the power consumer device is able to identify the amount of power that the power provider device is available to supply. The power consumer device may write the required amount of power in the SCDC configuration flag register, and may request the amount of power that the power consumer device requires to the power provider device.

2. Dynamic Power Allocation Through Broadcast Power Re-Negotiation

When a power provider device detects an inactivated interface among the interfaces through which power supply is available, through all of the interfaces connected to power consumer devices, the power provider device notifies that additional power supply is available to the corresponding power consumer devices. Each of the corresponding power consumer devices identifies the amount of power available to be supplied through the corresponding interface of the power provider device and requests the required amount of power consumption. The power provider device supplies the requested amount of power to the power consumer device of which priority is high based on each of the requested amounts of power.

In the case that this is applied to the HDMI interface, a power provider device performs the Power Re-Negotiation operation proposed in Invention 1 for each of the power consumer devices connected to the power provider device.

Meanwhile, in the present disclosure, the expression 'supply power' may represent to provide, support, transport or transfer power, and the expression 'receive power' may represent to consume power. However, the expression is not limited thereto, but all of various expressions for representing the operation of a specific device supplying power to another device may be applied to the present disclosure.

Although the present invention has been described by separate drawings for the convenience of description, it is also possible to design so as to implement a new embodiment by merging the embodiments described for each drawing. In addition, the construction and method of the embodiments described above are not limitedly applied to the display device, but a part or the whole of the embodiments may be selectively combined and constructed so as to implement various modifications.

While the preferred embodiments have been particularly shown and described, the present specification shall not be limited to the particular embodiments described above, and it will be understood by an ordinary skilled person in the art that various changes in form and details may be made therein without departing from the spirit and scope of the present invention as defined by the following claims, and the alternative embodiments should not be individually understood from the inventive concept and prospect of the present invention.

MODE FOR INVENTION

Various embodiments are described as a preferred form to implement the present invention.

INDUSTRIAL APPLICABILITY

The present invention is used in a series of HDMI fields

It will be understood to those skilled in the art that various modifications and variations can be made in the present invention described so far, without departing from the spirit or scope of the inventions. Therefore, the present invention is intended to include modifications and variations of the present invention provided by the attached claims and the equivalence.

The invention claimed is:

1. A method for supplying power performed by a power provider device including a plurality of ports, the method comprising:
   providing power to a plurality of power consumer devices through the plurality of ports which are connected to the plurality of power consumer devices through a High Definition Multimedia Interface (HDMI) cable;
   detecting a connection release between a first power consumer device among the plurality of power consumer devices and a port;
   based on a power level indicated by a Status and Control Data Channel (SCDC) status flag register being different from a power level indicated by an SCDC configuration flag register, detecting a second power consumer device (i) which is provided with insufficient power currently among the plurality of power consumer devices and (ii) which is a target of the power level indicated by the SCDC configuration flag register;
   notifying remaining supply power levels that are available to additionally supply to the second power consumer device;
   receiving a request of a power level that the second power consumer device is to receive among the remaining supply power levels; and
   supplying the power additionally to the second power consumer device as much as the requested power level.

2. The method for supplying power of claim 1, wherein the second power consumer device which is supplied with insufficient power currently corresponds to a power consumer device which is supplied with power in smaller power level than a power level which is available to receive.

3. The method for supplying power of claim 1, wherein, based on one or more second power consumer devices detected, the supplying the power additionally to the second power consumer device includes: supplying the power additionally sequentially according to the requested power level by the one or more second power consumer devices.

4. The method for supplying power of claim 1, wherein the remaining supply power level is a same as a power level which has been supplied to the released first power consumer device.

5. The method for supplying power of claim 1, wherein the notifying the remaining supply power levels that are available to additionally supply to the second power consumer device includes:
   updating a Status and Control Data Channel (SCDC) update flag register.

6. The method for supplying power of claim 4, wherein the notifying the remaining supply power levels that are available to additionally supply to the second power consumer device further includes:
   writing the remaining supply power level that is available to additionally supply in the SCDC status flag register; and
   transmitting the written remaining supply power level to the second power consumer device.

7. The method for supplying power of claim 1, wherein the receiving the request of the power level that the second power consumer device is to receive among the remaining supply power levels includes:

receiving an SCDC write message including power level information to be received by the second power consumer device from the second power consumer device; and writing a power level included in the received SCDC write message in the SCDC configuration flag register.

8. A power provider device for supplying power to a plurality of power consumer devices, the power provider device comprising:

a plurality of ports configured to transmit and receive data, which are connected to a plurality of power consumer devices through a High Definition Multimedia Interface (HDMI) cable;

a power controller configured to control power supply through the HDMI; and a processor configured to control the plurality of ports and the power controller, wherein the power provider device is configured to:

supply power to the plurality of power consumer devices through the plurality of ports, detect a connection release between a first power consumer device among the plurality of power consumer devices and a port, based on a power level indicated by a Status and Control Data Channel (SCDC) status flag register being different from a power level indicated by an SCDC configuration flag register, detect a second power consumer device (i) which is provided with insufficient power currently among the plurality of power consumer devices and (ii) which is a target of the power level indicated by the SCDC configuration flag register, notify remaining supply power levels that are available to additionally supply to the second power consumer device, receive a request of a power level that the second power consumer device is to receive among the remaining supply power levels, and supply the power additionally to the second power consumer device as much as the requested power level.

9. The power provider device of claim 8, wherein the second power consumer device which is supplied with insufficient power currently corresponds to a power consumer device which is supplied with power in smaller power level than a power level which is available to receive.

10. The power provider device of claim 8, wherein the power provider device is further configured to supply the power additionally sequentially according to the requested power level by one or more second power consumer devices.

11. The power provider device of claim 8, wherein the remaining supply power level is same as a power level which has been supplied to the released first power consumer device.

12. The power provider device of claim 8, wherein the power provider device is further configured to notify the power level that is available to additionally supply to the second power consumer device by updating a Status and Control Data Channel (SCDC) update flag register.

13. The power provider device of claim 12, wherein the power provider device is further configured to:

write the remaining supply power level that is available to additionally supply in the SCDC status flag register, and transmit the written remaining supply power level to the second power consumer device.

14. The power provider device of claim 8, wherein the power provider device is further configured to:

receive an SCDC write message including power level information that the second power consumer device is going to receive from the second power consumer device, and write a power level included in the received SCDC write message in the SCDC configuration flag register.

* * * * *